(12) United States Patent
Geshi et al.

(10) Patent No.: US 12,548,868 B2
(45) Date of Patent: Feb. 10, 2026

(54) POWER STORAGE DEVICE

(71) Applicant: Panasonic Intellectual Property Management Co., Ltd., Osaka (JP)

(72) Inventors: Shinya Geshi, Osaka (JP); Kazutoshi Kohira, Hyogo (JP); Shingo Kume, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 770 days.

(21) Appl. No.: 17/758,590

(22) PCT Filed: Jan. 22, 2021

(86) PCT No.: PCT/JP2021/002187
§ 371 (c)(1),
(2) Date: Jul. 11, 2022

(87) PCT Pub. No.: WO2021/153439
PCT Pub. Date: Aug. 5, 2021

(65) Prior Publication Data
US 2023/0048822 A1    Feb. 16, 2023

(30) Foreign Application Priority Data
Jan. 31, 2020    (JP) .................................. 2020-015788

(51) Int. Cl.
*H01M 50/578*    (2021.01)
*H01G 11/80*    (2013.01)
(Continued)

(52) U.S. Cl.
CPC .......... *H01M 50/578* (2021.01); *H01G 11/80* (2013.01); *H01M 50/107* (2021.01);
(Continued)

(58) Field of Classification Search
CPC ........... H01M 50/578; H01M 50/3425; H01M 2200/20; H01M 50/107; H01M 50/179;
(Continued)

(56) References Cited

U.S. PATENT DOCUMENTS 4,943,497 A * 7/1990 Oishi .................. H01M 10/052
429/54
6,228,523 B1 * 5/2001 Azema ................ H01M 50/574
429/57
(Continued)

FOREIGN PATENT DOCUMENTS

EP    3584853 A1    12/2019
JP    7-254402 A    10/1995
(Continued)

OTHER PUBLICATIONS

The EPC Office Action dated Jul. 5, 2024 for the related European Patent Application No. 21747523.5.
(Continued)

*Primary Examiner* — Jessie Walls-Murray
(74) *Attorney, Agent, or Firm* — Rimon P.C.

(57) ABSTRACT

A power storage device includes a case, a power storage element disposed in the case, a lead connected to an electrode of the power storage element, a sealing member sealing an opening of the case. The sealing member includes a gasket and a sealing plate having conductivity. The gasket includes a base having a disk shape. The base is disposed between the sealing plate and the power storage element. The base has a through-hole formed therein. The sealing plate includes a protrusion inserted in the through-hole. The protrusion of the sealing plate is connected to the lead. The protrusion is configured to be displaced in a direction away from the lead in accordance with an increase of an internal pressure of the case so as to be disconnected from the lead.

21 Claims, 7 Drawing Sheets

(51) Int. Cl.
*H01M 50/107* (2021.01)
*H01M 50/179* (2021.01)
*H01M 50/184* (2021.01)
*H01M 50/188* (2021.01)
*H01M 50/342* (2021.01)
*H01M 50/533* (2021.01)

(52) U.S. Cl.
CPC ....... *H01M 50/179* (2021.01); *H01M 50/184* (2021.01); *H01M 50/188* (2021.01); *H01M 50/3425* (2021.01); *H01M 50/533* (2021.01); *H01M 2200/20* (2013.01)

(58) Field of Classification Search
CPC ............. H01M 50/184; H01M 50/167; H01M 50/186; H01M 50/533; H01M 50/188; H01G 11/80; H01G 11/74
See application file for complete search history.

(56) References Cited

U.S. PATENT DOCUMENTS

| | | | | |
|---|---|---|---|---|
| 2006/0019159 | A1* | 1/2006 | Mori | H01M 50/536 |
| | | | | 429/176 |
| 2010/0216013 | A1* | 8/2010 | Kim | H01M 50/593 |
| | | | | 29/623.2 |
| 2015/0364735 | A1* | 12/2015 | Kohira | H01M 50/3425 |
| | | | | 429/55 |
| 2017/0025669 | A1* | 1/2017 | Urano | H01M 50/574 |
| 2018/0047973 | A1* | 2/2018 | Kunoike | H01M 10/0587 |
| 2018/0062124 | A1 | 3/2018 | Kohira et al. | |
| 2022/0223987 | A1* | 7/2022 | Do | H01M 50/3425 |
| 2022/0344771 | A1* | 10/2022 | Zhao | H01M 50/152 |

FOREIGN PATENT DOCUMENTS

| | | | | |
|---|---|---|---|---|
| JP | 11-111254 A | | 4/1999 | |
| JP | 11-224659 A | | 8/1999 | |
| JP | 2006-504244 A | | 2/2006 | |
| JP | 2009-266714 | | 11/2009 | |
| JP | 2012-174563 | | 9/2012 | |
| JP | 2013-242975 | | 12/2013 | |
| KR | 20180005455 A | * | 1/2018 | ........ H01M 10/4235 |
| WO | WO2004038831 A2 | | 5/2004 | |
| WO | 2016/157749 | | 10/2016 | |
| WO | 2016/157750 A1 | | 10/2016 | |

OTHER PUBLICATIONS

International Search Report of PCT application No. PCT/JP2021/002187 dated Apr. 13, 2021.

* cited by examiner

POWER STORAGE DEVICE

CROSS-REFERENCE TO RELATED APPLICATIONS

This application is a U.S. national stage application of the PCT International Application No. PCT/JP2021/002187 filed on Jan. 22, 2021, which claims the benefit of foreign priority of Japanese patent application No. 2020-015788 filed on Jan. 31, 2020, the contents all of which are incorporated herein by reference.

TECHNICAL FIELD

The present disclosure relates to a power storage device.

BACKGROUND ART

Power storage devices, such as secondary batteries and capacitors, are employed in various fields. For example, these power storage devices are employed in power tools, power-assisted bicycles, electric vehicles, and the like, and have a capacity increased.

Power storage devices employed in various fields are required to exhibit high safety even in a severe environment. A mechanism for ensuring safety, such as an explosion-proof valve or a current interrupting mechanism (CID), is conventionally provided in the secondary battery or the like. For example, as the secondary battery, a known cylindrical battery including an electrode body, a cylindrical exterior can, and a sealing body crimped and fixed to an opening of the exterior can with a gasket interposed therebetween. The sealing body includes a valve having a circular shape and crimped and fixed to the gasket, a metal sheet arranged closer to an inner side of the battery than the valve and connected to a central part of the valve, and an annular insulating member interposed between an outer peripheral part of the valve and an outer peripheral part of the metal sheet (for example, PTL 1). In this cylindrical battery, in a case where an internal pressure of the exterior can increase, the central part of the valve tends to move toward an outside of the battery due to the pressure. This moving force separates the valve from the metal sheet. The valve is disconnected from the metal sheet, and a current path in the cylindrical battery can be interrupted. In this cylindrical battery, a sealing mechanism and a safety mechanism of the exterior can are mounted with at least the valve, the metal sheet, the insulating member, and the gasket.

CITATION LIST

Patent Literature

PTL 1: International Publication No. WO2016/157749

SUMMARY OF THE INVENTION

Technical Problem

The power storage device described above requires a lot of components in order to perform sealing and safety functions. There is a concern that workability in assembling the power storage device deteriorates. Thus, a sealing member capable of securing safety with a simple structure is required. In such a situation, one object of the present disclosure is to provide a power storage device efficiently manufactured at low cost and has high safety.

Solution to Problem

One aspect of the present disclosure relates to a power storage device. The power storage device includes: a case including a tubular part having a cylindrical shape, a bottom part closing one end of the tubular part, and an opening provided at another end of the tubular part; a power storage element disposed in the case, the power storage element including a pair of electrodes; a lead connected to one electrode of the pair of electrodes; and a sealing member sealing the opening of the case. The sealing member includes a gasket having an insulating property and a sealing plate having conductivity, the gasket including a base having a disk shape. The sealing plate includes a displaceable part and an outer peripheral part provided around the displaceable part, the displaceable part including a protrusion protruding toward the power storage element. The base is disposed between the sealing plate and the power storage element. The base has a through-hole formed therein. The protrusion of the sealing plate is inserted in the through-hole. The protrusion of the sealing plate is connected to the lead. The protrusion is configured to be displaced in a direction away from the lead in accordance with an increase of an internal pressure of the case so as to be disconnected from the lead.

Advantageous Effect of Invention

According to the present disclosure, the number of components responsible for sealing and safety functions is reduced. Thus, the power storage device which can be efficiently manufactured at low cost and has high safety is obtained.

DESCRIPTION OF EMBODIMENT

Figure 1:
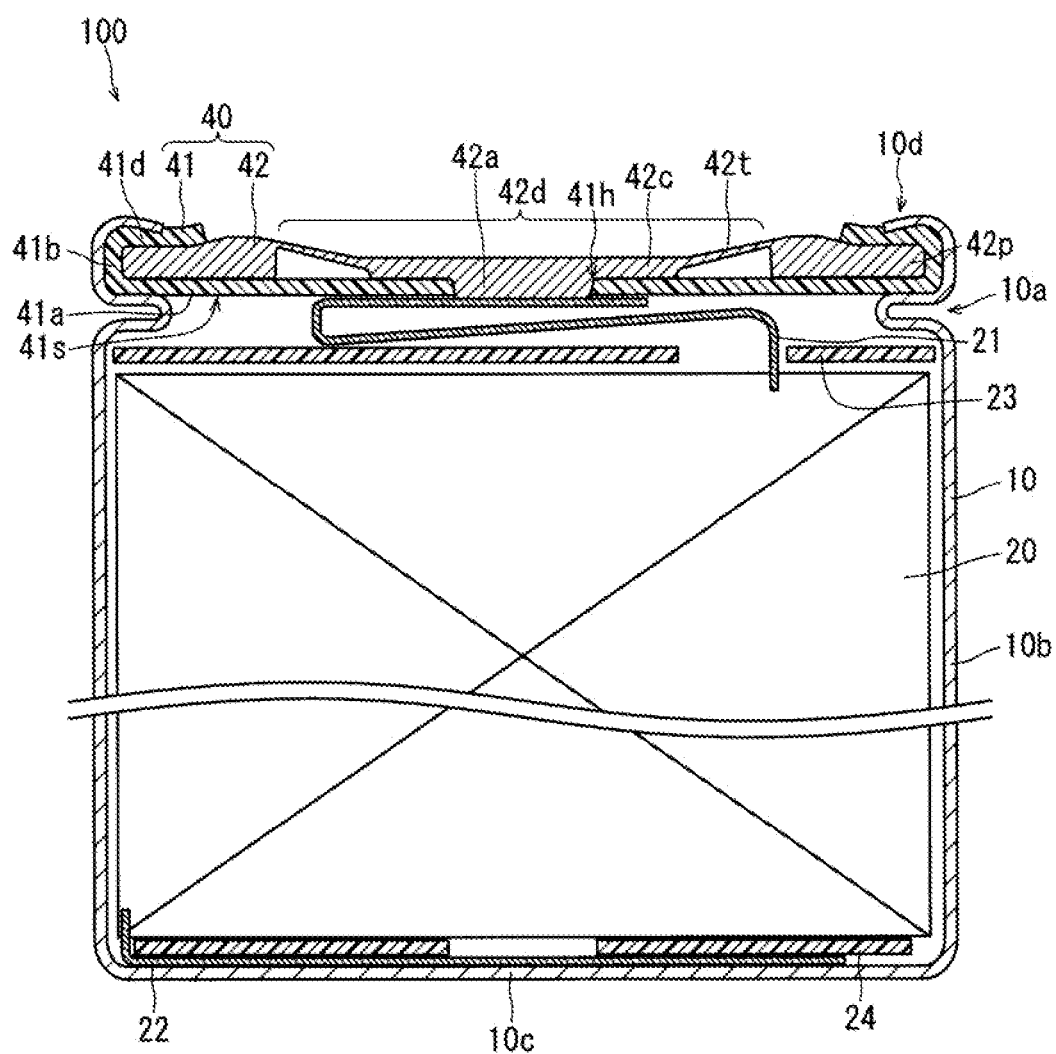
FIG. 1 is a schematic cross-sectional view of a power storage device of the present disclosure.

Hereinafter, an exemplary embodiment of the present disclosure will be described with reference to examples, but the present disclosure is not limited to examples to be described below. In the following description, specific numerical values and materials may be provided as examples, but other numerical values and materials may be applied as long as the effect of the present disclosure can be obtained.

Power Storage Device

A power storage device includes: a case including a tubular part having a cylindrical shape, a bottom part closing one end of the tubular part, and an opening provided at another end of the tubular part; a power storage element disposed in the case, the power storage element including a pair of electrodes; a lead connected to one electrode of the pair of electrodes; and a sealing member sealing the opening of the case. The sealing member includes a gasket having an insulating property and a sealing plate having conductivity, the gasket including a base having a disk shape. The sealing plate includes a displaceable part and an outer peripheral part provided around the displaceable part, the displaceable part including a protrusion protruding toward the power storage element. The base is disposed between the sealing plate and the power storage element. The base has a through-hole formed therein. The protrusion of the sealing plate is inserted in the through-hole. The protrusion of the sealing plate is connected to the lead. The protrusion is configured to be displaced in a direction away from the lead in accordance with an increase of an internal pressure of the case so as to be disconnected from the lead. Hereinafter, the through-hole formed in the disk-shaped base of the gasket may be referred to as "through-hole (G)", and the protrusion of the sealing plate inserted into through-hole (G) may be referred to as "protrusion (P)".

In the power storage device of the present disclosure, the displaceable part (protrusion (P)) of the sealing plate is displaced in a direction away from the lead in accordance with to an increase in internal pressure of the case. Protrusion (P) of the sealing plate displaced in a direction away from the lead disconnects protrusion (P) of the sealing plate from the lead. That is, the sealing plate and the lead function as a current interrupt device (CID). The CID cuts off a current path in the power storage device in a case where the inside of the case exceeds a predetermined pressure due to accumulation of gas in the case due to overcharge or the like. Upon being cut off, the current path stops charging and discharging of the power storage device in which the pressure increases, thereby preventing the power storage device from being unsafe and breaking due to the increase of the pressure.

In the power storage device of the present disclosure, in addition to the function of the CID, the sealing plate may brake to release the gas in the case to the outside of the case when the internal pressure of the case further increases. Such a sealing plate suppresses the rupture of the power storage device of the present disclosure, thus enhancing the safety. The sealing member of the present disclosure includes a smaller number of components and has a simpler structure than the conventional sealing member having the above function. The power storage device according to the present disclosure thus reduces manufacturing cost and assembly work-hours while maintaining safety.

Since the number of components of the sealing member of the present disclosure is small, a volume of the component may be reduced as compared with the conventional sealing member having the same function. Thus, the power storage device of the present disclosure may have a larger energy density than the conventional power storage device.

The power storage device may be a secondary battery or may be a capacitor. The power storage device may be a non-aqueous electrolyte secondary battery (lithium ion secondary battery, lithium battery, or the like), a nickel-hydrogen secondary battery, or the like. The power storage device may be an electric double layer capacitor including activated carbon as an electrode material, a lithium ion capacitor, or the like can also be used.

The power storage element is not particularly limited, and may be selected in accordance with a type of the power storage device. A known power storage element can be used as the power storage element. For example, in a case where the power storage device is the secondary battery, a power storage element including a positive electrode, a negative electrode, a separator, and an electrolyte solution may be used. The negative electrode of the lithium ion secondary battery of one example contains, as a negative-electrode active material, a substance that reversibly occludes and releases lithium ions. Examples of the negative electrode active material include carbon materials such as graphite and inorganic compounds such as silicon and titanium oxide. The positive electrode of the secondary battery may contain a transition metal composite oxide containing lithium as a positive-electrode active material. The transition metal composite oxide contains, for example, elements such as nickel, manganese, cobalt, and aluminum.

In a case where the power storage device is a capacitor, a power storage element may include two electrodes, an electrolyte solution, and a separator. These elements may be selected in accordance with the type of the capacitor.

Case

The case may function as, for example, one of electrode terminals. Upon functioning as the electrode terminal, for example, the case may be made of conductive metal, and one electrode (electrode not electrically connected to the sealing plate) of the power storage element is electrically connected to the case. For example, a negative electrode is electrically connected to the case. In the power storage device of the present disclosure, the positive electrode may be connected to the case.

The case includes a tubular part having a cylindrical shape, a bottom part closing one end of the tubular part, and an opening at another end of the tubular part. The tubular part may have a groove with an annular shape. The groove falls from an outer circumferential surface of the case toward an inner circumferential surface of the case along a radial direction of the tubular part. The sealing member may be disposed on the groove. An opening end of the case is crimped to be bent to an inside of the tubular part (toward a central axis of the tubular part) along the radial direction of the tubular part. The bent opening end is crimped to the outer peripheral part of the sealing plate with a fold part of the gasket of the sealing member to interposed therebetween. The sealing member may be sandwiched between the crimped opening end and the groove. Accordingly, the opening of the case is sealed. For example, a metal case may be used as the case. The metal case may be made of aluminum, iron, nickel-copper, an alloy of these metals, a clad material, or the like. The case of the power storage device is not limited to the above configuration, and a known case may be used.

Lead

The lead electrically connects the electrode of the power storage element to the sealing plate. A lead used in a known power storage device may be used as the lead. A metal foil with a strip shape may be used as the lead. Examples of the metal (conductive metal) constituting the lead include aluminum, iron, nickel, copper, an alloy containing plural metals among these metals, a clad material, and the like. One end of the lead may be connected to one electrode of two electrodes of the power storage element. In a case where the power storage device is the secondary battery, for example, the lead is connected to a positive electrode.

The other end of the lead or a portion near the other end is connected (fixed) to the sealing plate. That is, the lead is electrically and physically connected to the sealing plate. A method for connecting the lead to the sealing plate is not particularly limited, and for example, welding or the like may be used. In order to function as a CID, it is necessary to employ a connection method for releasing the connection between the lead and the sealing plate (that is, the fixing is released) when a force for separating the lead and the sealing plate from each other increases. In a case where the lead is bonded to the sealing plate by welding, a force required to separate the lead from the sealing plate may be controlled by changing conditions such as a welding area and a welding depth. A welding method is not particularly limited, and laser welding, resistance welding, friction stirring, ultrasonic welding, or the like may be used.

From the viewpoint of reducing the number of components, the lead is preferably connected directly to the sealing plate. However, as long as the lead functions as the CID, the lead may be indirectly connected to the sealing plate with a conductor interposed therebetween.

Sealing Plate

The sealing plate is, for example, a circular disk with conductivity. The sealing plate may function as an electrode terminal, or may function as a displaceable member electrically connecting the electrode terminal (for example, a terminal cap) to the lead. The sealing plate is made of, for example, a metal sheet made of, for example, metal such as aluminum, nickel, copper, or iron, an alloy containing plural metals among these metals, or a clad material. A known sealing plate (such as a valve) may be used as the sealing plate.

The sealing plate may include a displaceable part and an outer peripheral part provided around the displaceable part. The displaceable part is configured to be displaced in accordance with the internal pressure of the case. A collector part including a protrusion protruding toward the lead is formed in the displaceable part. A distal end of the protrusion may be positioned at an opening (or near the opening) of through-hole (G) closer to the power storage element than another opening of the through-hole or may be positioned at a position closer to the power storage element than the opening of through-hole (G).

The displaceable part of the sealing plate may be configured to be displaced due to a pressure in the case which is equal to or higher than a predetermined value. A thin part thinner than the outer peripheral part may be formed in the displaceable part. For example, the sealing plate may include a thin part thinner than the collector part and the outer peripheral part between the portion (collector part) where protrusion (P) is formed and the outer peripheral part. The displaceable part may be formed in, for example, a disk shape or a dome shape. In a case where the sealing plate includes the dome-shaped displaceable part, the dome-shaped displaceable part is arranged so as to protrude toward the power storage element. In order to increase the displacement of protrusion (P), protrusion (P) may be formed, for example, at a center of the displaceable part of the sealing plate (the center of the collector part).

The shape of a distal end surface of the protrusion (the surface to which the lead is connected) may have a longitudinal direction along a direction in which a region of the lead facing the sealing member extends. This configuration allows a bonding area of a region of the lead bonded to the protrusion of the sealing plate to be easily increased without expanding the region of the lead in four directions. Thus, it is easy to increase bonding strength between the lead and the protrusion. A distance from an edge of the region bonded to the protrusion in the lead to the bonded part of the lead tends to be short. Therefore, when the sealing plate is displaced, the region of the lead to be bonded may be hardly bent, accordingly preventing the lead from following the displacement of the sealing plate. For example, a width of the distal end surface having the longitudinal direction may be narrower than a width of a portion of the lead connected to the distal end surface. That is, for example, the entire distal end surface of the protrusion may be covered with the lead. A thickness of the portion (collector part) of the displaceable part where the protrusion is formed may be larger than the other region of the displaceable part. This configuration suppresses a delay of an activation timing of the CID as compared with the protrusion formed such that a back surface of the protrusion (the upper surface of the sealing plate) is recessed in the displaceable part substantially by the same dimension as a protrusion height of the protrusion.

In a case where the internal pressure of the case further increases and the displacement of the sealing plate particularly increases after the function of the CID is activated and the sealing plate and the lead are broken, the thin part of the sealing plate may be broken to release the gas inside the case to the outside of the case. This configuration prevents the case from being ruptured.

Gasket

The gasket is made of a material having elasticity and an insulating property functioning as the gasket. That is, the gasket has an insulating property. The gasket may be made of a known material of a gasket of secondary batteries or capacitors. Examples of the material of the gasket include polypropylene (PP), polyphenylene sulfide (PPS), polybutylene terephthalate (PBT), perfluoroalkoxy alkane (PFA), and polyether ether ketone (PEEK). Additives (for example, known additives) may be added to these materials as necessary. A method for forming the gasket is not limited, and the gasket may be formed by a method, such as injection molding.

The gasket includes, for example, a rising part and a fold part with an annular shape. The rising part extends from a peripheral edge of the base in a direction away from the power storage element. The fold part extends from an end of the rising part toward the inside of the case (toward the central axis of the case) and covers at least a part of an upper surface of an outer peripheral part of the sealing plate. The rising part and the fold part are arranged between the sealing plate and the inner circumferential surface of the case near the opening end to insulate the case from the sealing plate.

A cross-sectional shape of through-hole (G) formed in the base of the gasket (a shape of a cross section perpendicular to a thickness direction of the base of the gasket) is not particularly limited as long as the cross-sectional shape is a shape into which the protrusion of the sealing plate can be inserted. The shape of the through-hole may be, for example, a circular shape, an elliptical shape, a rectangular shape (including a square shape), or a rectangular shape with rounded corners. The shape of the opening of the through-hole may also be a shape having a longitudinal direction parallel to a longitudinal direction of the distal end surface in accordance with the shape of the protrusion having the longitudinal direction. In order to prevent the lead from following the displaceable part of the sealing plate when the displaceable part is displaced, a gap in through-hole (G) of the gasket between protrusion (P) and the opening of through-hole (G) on the lead side may be reduced. Thus, when the protrusion of the sealing plate and the gasket are viewed from the power storage element, an outer shape of the protrusion and the shape of the opening of the through-hole of the gasket may substantially have the same size and shape. A position of the through-hole corresponds to a position of the protrusion of the sealing plate. The through-hole may be formed, for example, in a central part of the disk-shaped base or near the central part.

The power storage device of the present disclosure may satisfy the following configurations (1) and (2).

(1) The gasket includes the rising part extending from the peripheral edge of the base in the direction away from the power storage element, and the annular fold part extending from the end of the rising part (the end farther from the power storage element) toward the inside of the case (toward the central axis of the case). The fold part covers at least a part of the upper surface of the outer peripheral part of the sealing plate.

(2) The groove with eh annular shape is formed in the outer circumferential surface of the tubular part of the case. The region of the inner circumferential surface of the tubular part in which the groove is formed protrudes to the inside of the case. The sealing member is positioned on the groove. Another end of the tubular part is bent toward the inside of the case and contacts the upper surface of the fold part. The upper surface of the fold part is a surface of the fold part farther from the power storage element than another surface of the fold part.

The sealing plate may include the thin part between the outer peripheral part and the collector part where the protrusion is formed. The thin part is thinner than the collector part and the outer peripheral part.

The inner circumferential surface (side surface) of through-hole (G) may be inclined such that through-hole (G) tapers toward the lead. That is, the inner circumferential surface of the through-hole of the gasket may have a tapering shape becoming thinner as shifting in a direction from the sealing plate toward the power storage element. The through-hole having the above shape allows protrusion (P) of the sealing plate to be displaced smoothly, accordingly increasing the reliability of the CID in the power storage device.

In a case where the through-hole of the gasket has the above-mentioned tapering shape, the outer peripheral surface of protrusion (P) of the sealing plate may also have a tapering shape tapering toward the power storage element. This configuration allows protrusion (P) of the sealing plate to be displaced smoothly, accordingly increasing the reliability of the CID in the power storage device.

The outer circumferential surface of protrusion (P) of the sealing plate may contact the inner circumferential surface of through-hole (G). This configuration allows protrusion (P) to be held by the gasket, thereby suppressing the breakage of the sealing plate and the lead at a time other than an activation time of the CID. Alternatively, a gap may be formed between the outer circumferential surface of the protrusion and the inner circumferential surface of through-hole (G). That is, the protrusion may have a shape with at least a part thereof not contacting the inner circumferential surface of through-hole (G). This configuration suppresses heat transmitted from the protrusion to the gasket when the lead is welded to the protrusion, accordingly suppressing a problem caused by the deformation of the gasket due to heat (for example, a problem related to the displacement of the sealing plate).

A vent hole for transmitting the internal pressure of the case to the sealing plate may be formed in the base of the gasket. The internal pressure of the case can be transmitted to the sealing plate only through through-hole (G) into which protrusion (P) of the sealing plate is inserted. However, the internal pressure of the case is quickly and reliably transmitted to the sealing plate through the vent hole. The vent hole may be provided at a position not overlapping the lead. This configuration prevents the lead from blocking the vent hole when the gas flows into the vent hole. However, in the power storage device of the present disclosure, the vent hole may be provided at a position overlapping the lead unless a possibility that the lead blocks the vent hole is considered.

Through-hole (G) may have a longitudinal direction along a single direction (first direction), and protrusion (P) of the sealing plate may have a longitudinal direction along the first direction when viewed from the bottom part of the case. Hereinafter, the first direction may be referred to as "first direction D1".

The lead may include a strip part connected to protrusion (P) of the sealing plate. The strip part is connected to protrusion (P) with a welded part. The welded part may have a longitudinal direction along first direction D1 when viewed from the bottom part of the case.

The lead may include a strip part connected to protrusion (P) of the sealing plate. A one end of the strip part in a direction in which the lead extends may cross first direction D1 when viewed from the bottom part of the case.

At least one rib (for example, plural ribs) may be provided on the surface of the base of the gasket facing the lead. The rib increases the rigidity of the base of the gasket, and prevents the lead from following the displacement of the sealing plate upon the activation of the CID. The rib allows a part of the lead to be engaged with the rib, thereby allowing the lead to hardly follow the displacement of the sealing plate upon the activation of the CID. Thus, the reliability of the function of the CID is enhanced. The rib facilitates the positioning of the lead when the lead is connected to the sealing plate, and prevents stress from being applied to a joint location between the lead and the sealing plate due to the displacement of the lead. In a case where the vent hole is formed in the gasket, the lead is prevented from overlapping the vent hole.

The movement of the lead may be suppressed by interference between the lead and the at least one rib. That is, the movement of the lead may be suppressed by engaging the lead with the rib. In a case where the lead is displaced in accordance with the displacement of protrusion (P) of the sealing plate, the connection between the sealing plate and the lead may be hardly released even when the displacement of protrusion (P) increases. The displacement of the lead is suppressed by interference between the rib formed on the gasket and the lead, and thus, it is possible to enhance the reliability of the CID. In a case where the displacement of the lead is suppressed by the interference between the lead and the rib, the distance between the lead and the rib at the position where the interference occurs may range from 0 mm to 0.6 mm.

The at least one rib formed on the base of the gasket may comprise two ribs arranged such that through-hole (G) of the base are position between the two ribs. The lead may include a strip part disposed between the two ribs and connected to protrusion (P) of the sealing plate. As an example of the arrangement of the lead and the rib in this case, first and second examples will be described below. The two ribs may be arranged substantially parallel to each other. In this specification, "substantially parallel" means that the ribs are arranged in parallel or at an angle close to the parallel state, and for example, means that an angle formed by directions in which the two ribs extend is less than or equal to 10°.

In the first example, the lead and the two ribs may be configured as follows. The lead includes a wide part that is connected to the strip part (for example, one end of the strip part in the longitudinal direction) and having a width wider than the strip part. A width of the wide part is larger than a distance between the two ribs. With this configuration, a region facing the rib is engaged with the rib in a peripheral edge of the wide part. Thus, the lead is difficult to be displaced when the sealing plate is displaced. In this configuration, the number of ribs may not be two. Even though there is only one rib, the displacement of the lead can be suppressed as compared with a configuration without any rib. Edges of the wide part and the strip part may have a shape which consists of plural straight lines connected to one another or which may include a curved line.

In the second example, the lead and the two ribs may be configured as follows. The lead includes two wide parts connected to both ends of the strip part (for example, one end of the strip part in the longitudinal direction and the other end opposite to the one end) and having a width larger than a width of the strip part. The widths of the two wide parts are larger than a distance between the two ribs. The lead is arranged such that at least a part of the two ribs the two wide parts sandwich at least respective parts of the two ribs. This configuration, the region of the peripheral edge of the wide part facing the rib is engaged with the ribs. This engagement prevents the lead from being displaced when the sealing plate is displaced. The lead is connected (fixed) to the sealing plate. In other words, cutouts are formed in both ends of the strip part in a width direction, and each of the two ribs is accommodated in respective one of the cutouts. The number of cutouts and the number of ribs may not necessarily be two. Even only one cutout and one rib cause the lead to be more hardly displaced than a configuration without the rib and the cutout. The rib may have a columnar shape that fills most of the cutout, or may have a shape extending along a shape of the edge of the cutout. The edge of the cutout may have a rectangular shape, a U-shape, a V-shape, or a C-shape.

A through-hole may be formed in the strip part of the lead, and the rib may be fitted into the through-hole. In this case, the through-hole formed in the lead may be a round hole or a rectangular hole. In a case where the gasket and the lead are viewed from an electrode group side, a shape of the hole may substantially be the same as the rib, or the rib may be smaller than an opening of the hole. In a case where the through-hole of the strip part is fitted into the rib, the lead may be press-fitted into the rib, thereby allowing the lead to be more firmly fixed to the gasket. When the sealing plate and the lead are viewed from the electrode group, the through-hole of the lead and the distal end surface of the protrusion may be arranged in the longitudinal direction of the strip part.

The power storage device of the present disclosure may include a terminal cap (not illustrated) connected to the sealing plate. The terminal cap is made of a conductive material (for example, a conductive metal), and may include a protrusion functioning as a terminal. The terminal cap may include a flat portion with a donut shape and a protrusion formed at a center of the flat portion. The terminal cap is arranged opposite to the power storage element with respect to the sealing plate. That is, the sealing plate is arranged between the terminal cap and the power storage element. In one example, a peripheral edge of the terminal cap is placed on a peripheral edge of the sealing plate, and the two peripheral edges are crimped at the opening end of the case with the gasket interposed therebetween. In this case, a vent hole configured to release gas inside the case when the sealing plate is broken may be formed in the terminal cap.

One aspect of the present disclosure relates to the sealing member described above. As described above, the sealing member according to the present disclosure includes the gasket including the base with a disk shape and the sealing plate having conductivity. The base is arranged between the sealing plate and the power storage element. Through-hole (G) is formed in the base. Protrusion (P) provided in the displaceable part of the sealing plate is inserted into through-hole (G).

Hereinafter, an example of a power storage device of the present disclosure and an example of a method for manufacturing a power storage device will be specifically described with reference to the drawings, but the power storage device of the present disclosure is not limited to the following contents. The above-described configuration elements can be applied to configuration elements of a power storage device as an example to be described below. Configuration elements of a power storage device as one example to be described below may be changed based on the above description, or configuration elements that are not essential to the power storage device of the present disclosure may be omitted. Matters to be described below may be applied to the above-described exemplary embodiment.

Exemplary Embodiment 1

An example of a power storage device according to Exemplary Embodiment 1 of the present disclosure will be described. FIG. 1 a schematic cross-sectional view of power storage device 100 according to Embodiment 1. Power storage device 100 includes case 10, power storage element 20 disposed in case 10, leads 21 and 22 connected to electrodes (not illustrated) of power storage element 20, and sealing member 40 sealing an opening of case 10. Power storage device 100 further includes insulating plates 23 and 24. Each of insulating plates 23 and 24 has a disk shape and has a through-hole formed therein.

Sealing member 40 includes gasket 41 including base 41a with a disk shape and sealing plate 42. Base 41a is arranged between sealing plate 42 and power storage element 20. Through-hole 41h is formed in a center of base 41a. Base 41a has a planar shape substantially having the same size as a planar shape (circular shape) of sealing plate 42. A peripheral edge of base 41a securely contacts a peripheral edge of sealing plate 42.

Case 10 includes tubular part 10b having a cylindrical shape, bottom part 10c closing one end of tubular part 10b, and opening 10d constituting the other end (opening end) of tubular part 10b. Groove 10a with an annular shape falling from an outside of case 10 toward an inside of case 10 in a radial direction of tubular part 10b is formed near opening 10d of tubular part 10b. Sealing member 40 is disposed on an inner circumferential surface of groove 10a. An opening end of opening 10d of case 10 is crimped to an outer peripheral part of sealing plate 42 with gasket 41 interposed therebetween. Accordingly, sealing member 40 is sandwiched between groove 10a and the opening end to seal case 10.

Gasket 41 includes rising part 41b and fold part 41d with an annular shape. Rising part 41b extends from the peripheral edge of base 41a in a direction away from power storage element 20. Fold part 41d extends from an end of rising part 41b toward the inside of case 10 and covers at least a part of an upper surface of outer peripheral part 42p of sealing plate 42.

Sealing plate 42 includes displaceable part 42d with a dome shape protruding toward power storage element 20 and outer peripheral part 42p provided around displaceable part 42d. At least a part of displaceable part 42d is locally thin so as to be broken when the displacement of displaceable part 42d increases. A collector part in which protrusion 42a protruding toward power storage element 20 is formed is provided at central part 42c (collector part) of displaceable part 42d. Protrusion 42a of sealing plate 42 is inserted into through-hole 41h of gasket 41. A distal end surface of protrusion 42a may be flush with near surface 41s of gasket 41 or near surface 41s of gasket 41 on power storage element 20 side, or may protrude toward power storage element 20 from surface 41s. Lead 21 is fixed (connected) to the distal end surface of protrusion 42a.

Sealing plate 42 includes thin part 42t thinner than outer peripheral part 42p. More specifically, sealing plate 42 includes thin part 42t between outer peripheral part 42p and central part 42c where protrusion 42a is formed.

In accordance with Embodiment 1, an example in which no gap is provided between protrusion 42a and through-hole 41h is illustrated, a gap may be provided between protrusion 42a and through-hole 41h. That is, protrusion 42a may not necessarily contact a side surface (inner circumferential surface) of through-hole 41h. In accordance with Embodiment 1, an example in which a shape of an opening of through-hole 41h is an oval shape having a longitudinal direction along first direction D1 and a shape of the distal end surface of protrusion 42a is a shape having a longitudinal direction parallel to the longitudinal direction of the opening of through-hole 41h is illustrated. These shapes may be shapes other than described above. For example, each of protrusion 42a and through-hole 41h may have a truncated conical shape.

Figure 5:
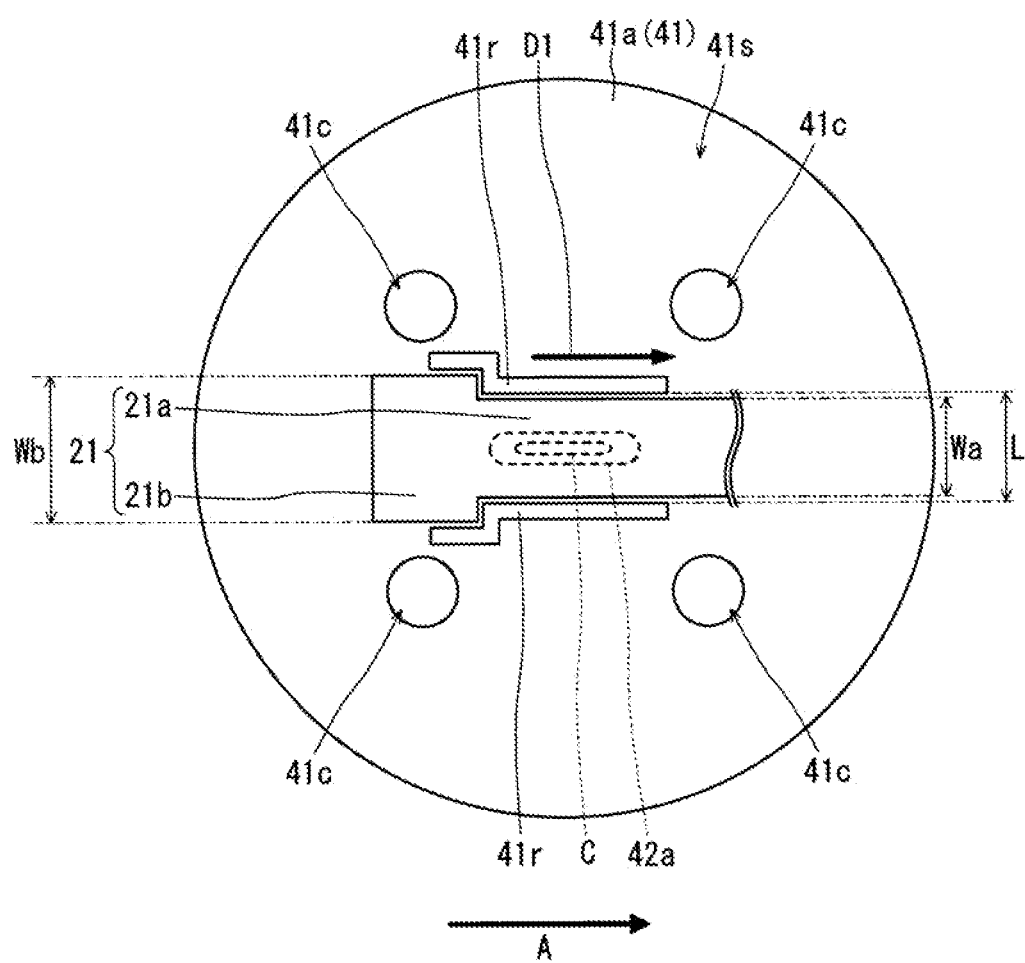
FIG. 5 is a bottom view of the power storage device illustrated in FIG. 1 for schematically illustrating another example of the sealing member and the lead of the power storage device.
Figure 6:
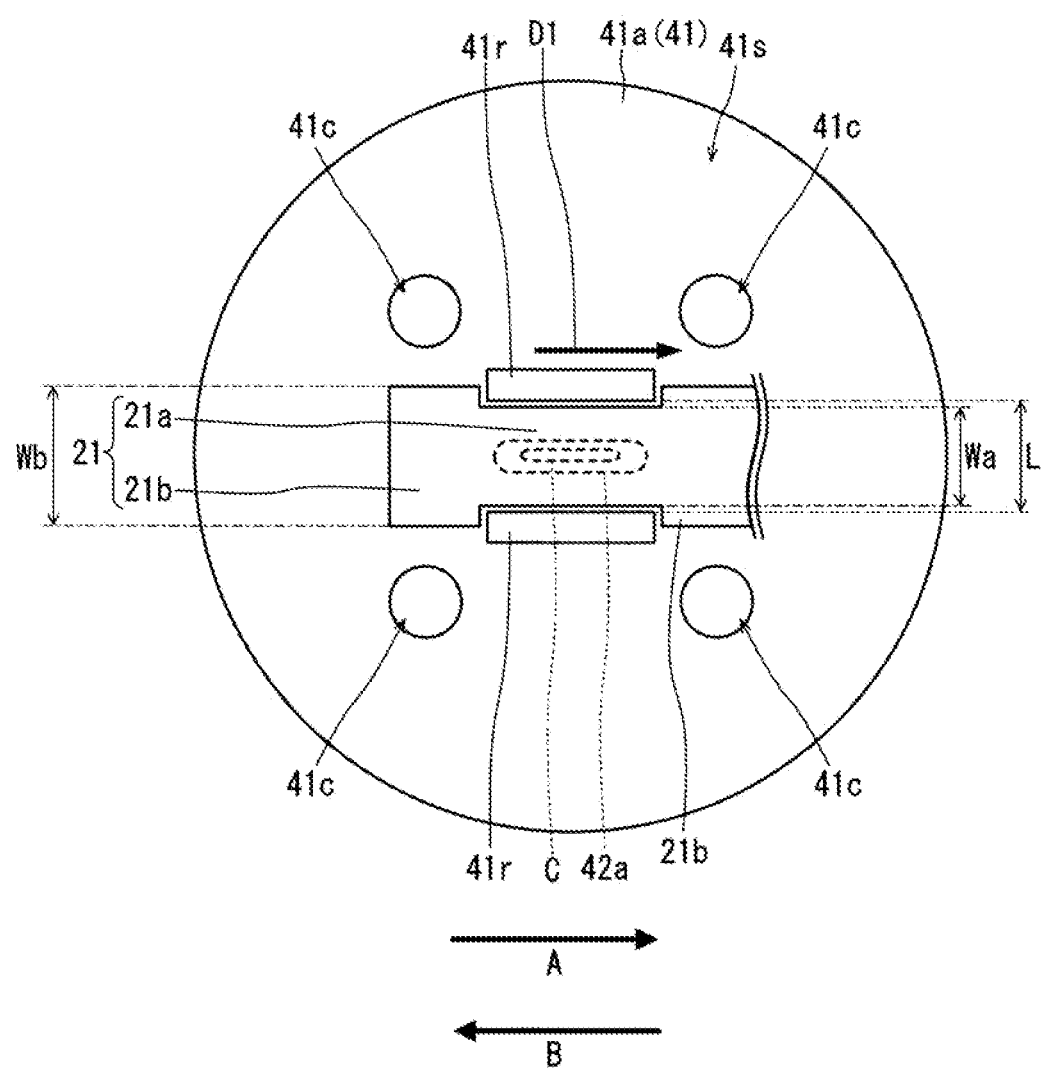
FIG. 6 is a bottom view of the power storage device illustrated in FIG. 1 for schematically illustrating another example of the sealing member and the lead of the power storage device.

Connection part C (for example, a welded part) where protrusion 42a is connected to lead 21 may have the longitudinal direction along first direction D1 as illustrated in FIGS. 5 and 6.

Figure 2:
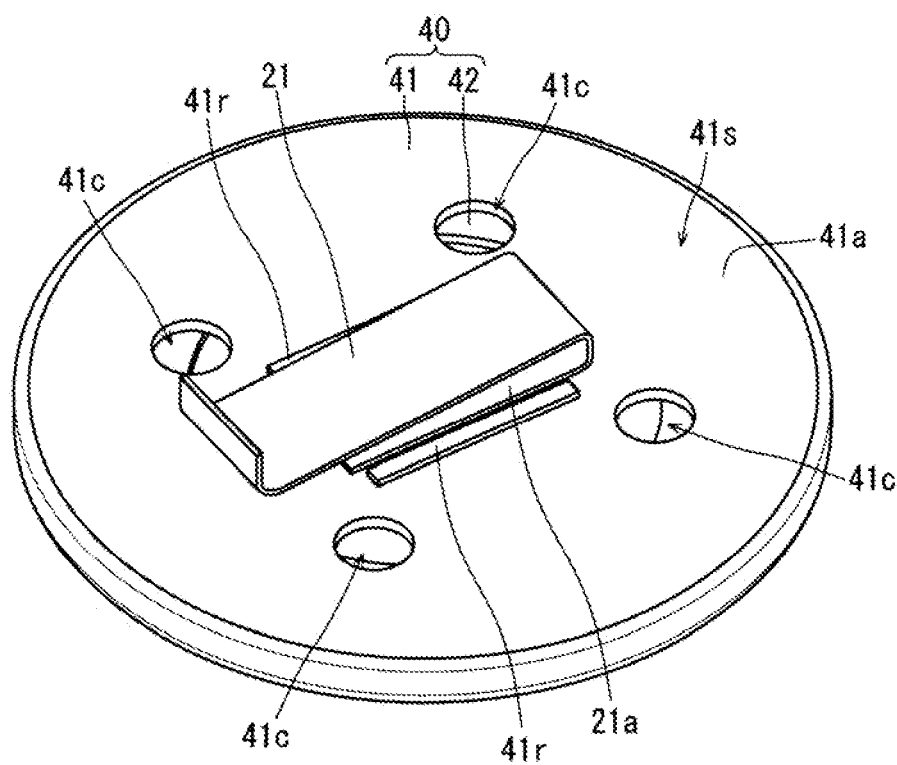
FIG. 2 is a perspective view of the power storage device illustrated in FIG. 1 for schematically illustrating a sealing member and a lead of the power storage device.
Figure 3:
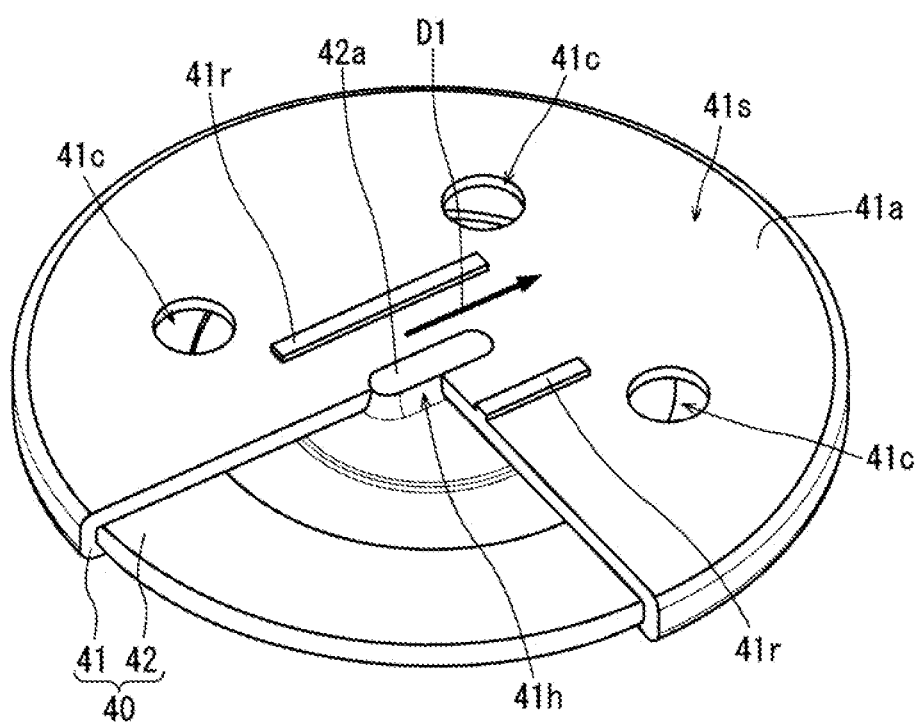
FIG. 3 is a perspective view the power storage device illustrated in FIG. 1 for schematically illustrating a gasket partially cut out in the sealing member and the lead of the power storage device.
Figure 4:
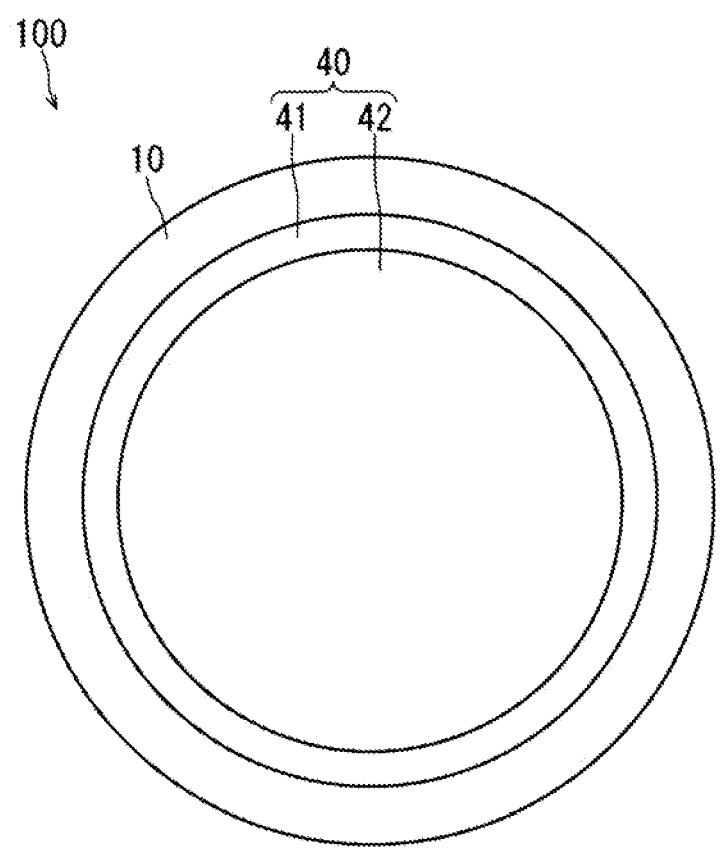
FIG. 4 is a top view schematically illustrating the power storage device illustrated in FIG. 1.

FIG. 2 is a schematic perspective view of lead 21 and sealing member 40 when viewed from surface 41s side. FIG. 3 is a schematic partially exploded perspective view of the device in which a part of gasket 41 and lead 21 are removed from FIG. 2. FIG. 4 is a schematic top view of power storage device 100 viewed from sealing plate 42. The cross-sectional view of FIG. 1 illustrates a cross-section of the device taken along the longitudinal direction of ridge-shaped protrusion 42a illustrated in FIG. 3.

As illustrated in FIGS. 2 and 3, plural vent holes 41c (through-holes) are formed in base 41a of gasket 41. Vent holes 41c communicates with displaceable part 42d such that an internal pressure of case 10 is transmitted to displaceable part 42d.

Two ribs 41r arranged substantially in parallel with through-hole 41h interposed therebetween are formed on surface 41s of base 41a of gasket 41. Each rib 41r extends in a direction parallel to the longitudinal direction (first direction D1) of protrusion 42a.

Rib 41r is, for example, a linear protrusion. Lead 21 includes strip part 21a disposed between two ribs 41r. A shape of the distal end surface of protrusion 42a is smaller than a planar shape of strip part 21a. A part of strip part 21a is fixed to the distal end surface of protrusion 42a by welding or the like.

When the internal pressure of case 10 increases, protrusion 42a of displaceable part 42d moves in a direction away from power storage element 20 (that is, in a direction away from lead 21). On the other hand, the movement of lead 21 is suppressed by base 41a. When the displacement of protrusion 42a increases, the connection part between protrusion 42a and lead 21 breaks, and the connection is released, thereby suppressing overcharge of the device and the like.

When the internal pressure of case 10 further increases and the displacement of displaceable part 42d further increases, a portion of thin part 42t or a peripheral edge thereof breaks. As a result, a gas inside case 10 is released to the outside of case 10.

In the structure illustrated in FIGS. 2 and 3, the movement of strip part 21a is suppressed by ribs 41r. Specifically, the movement of strip part 21a in a direction perpendicular to the longitudinal direction of strip part 21a (direction parallel to first direction D1) is suppressed. The movement of strip part 21a in the longitudinal direction of strip part 21a may be suppressed by interference between lead 21 and the ribs 41r. A first example of such a form is schematically illustrated in FIG. 5, and a second example is schematically illustrated in FIG. 6. FIGS. 5 and 6 illustrate a part of lead 21 and gasket 41 viewed from surface 41s, respectively.

In the example shown in FIG. 5, lead 21 includes strip part 21a and wide part 21b connected to one end of strip part 21a. Strip part 21a is disposed between two ribs 41r. Wide part 21b has a width larger than width Wa of strip part 21a. Lead 21 may be formed by cutting a single metal sheet into a predetermined shape (the same applies to lead 21 illustrated in FIG. 6). Width Wb of wide part 21b is larger than distance L between two ribs 41r. Thus, the movement of strip part 21a is suppressed by the interference between wide part 21b and each rib 41r. In the example illustrated in FIG. 5, strip part 21a is prevented from moving in a direction of arrow A. At this time, rib 41r is bent and extends in a crank shape (step shape) along a shape of a peripheral edge of lead 21.

In the example shown in FIG. 6, lead 21 includes strip part 21a and two wide parts 21b connected to both ends of strip part 21a in the longitudinal direction. Strip part 21a is disposed between two ribs 41r. Two wide parts 21b have widths larger than width Wa of strip part 21a. Two wide parts 21b are arranged so as to sandwich at least respective parts of two ribs 41r. Widths Wb of two wide parts 21b are larger than distance L between two ribs 41r. Thus, the movement of strip part 21a is suppressed by the interference between two wide parts 21b and two ribs 41r. In the example illustrated in FIG. 6, strip part 21a is prevented from moving in directions of arrows A and B. Widths Wb of two wide parts 21b may be identical to each other or different from each other.

In the above example, an edge of one end in a direction in which lead 21 extends crosses first direction D1 when viewed from bottom part 10c of case 10.

Figure 7:
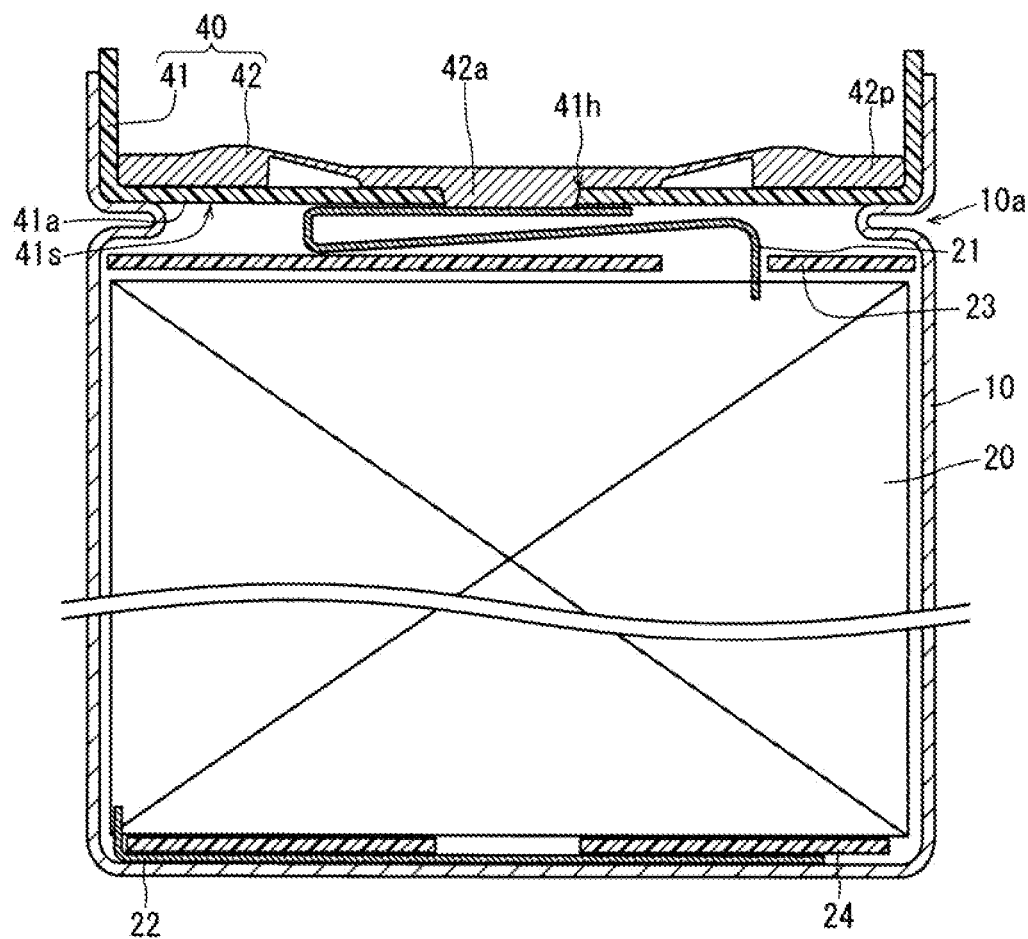
FIG. 7 is a cross-sectional view of the power storage device illustrated in FIG. 1 for schematically illustrating a process for manufacturing the power storage device.

A method for manufacturing power storage device 100 illustrated in FIG. 1 will be described below. First, a structure shown in FIG. 7 is formed. Groove 10a is formed after power storage element 20 is disposed in case 10. Lead 21 is connected to protrusion 42a and one of the electrodes of power storage element 20. Lead 22 is connected to case 10. Subsequently, the opening end of case 10 is bent inward, and outer peripheral part 42p of sealing plate 42 is crimped with a tubular wall of gasket 41 between case 10 and sealing plate 42, thereby forming fold part 41d is formed from the tubular wall. Power storage device 100 is thus be manufactured. Processes used in a known method for manufacturing a power storage device may be applied to these processes.

INDUSTRIAL APPLICABILITY

The present disclosure is applicable to a power storage device.

REFERENCE MARKS IN THE DRAWINGS 10 case
20 power storage element
21, 22 lead
40 sealing member
41 gasket
41a base
41b rising part
41c vent hole
41d fold part
41h through-hole
41r rib
42 sealing plate
42a protrusion
42d displaceable part
100 power storage device
connection part C (welded part)

The invention claimed is:

1. A power storage device comprising:
a case including a tubular part having a cylindrical shape, a bottom part closing one end of the tubular part, and an opening provided at another end of the tubular part;
a power storage element disposed in the case, the power storage element including a pair of electrodes;
a lead connected to one electrode of the pair of electrodes; and
a sealing member sealing the opening of the case, wherein:
the sealing member includes a gasket having an insulating property and a sealing plate having conductivity, the gasket including a base having a disk shape,
the sealing plate includes a displaceable part and an outer peripheral part provided around the displaceable part, the displaceable part including a protrusion protruding toward the power storage element,
the base is disposed between the sealing plate and the power storage element,
the base has a through-hole formed therein,
the protrusion of the sealing plate is inserted in the through-hole,
the protrusion of the sealing plate is connected to the lead,
the protrusion is configured to be displaced in a direction away from the lead in accordance with an increase of an internal pressure of the case so as to be disconnected from the lead,
the through-hole extends elongatedly along a first direction, and the protrusion of the sealing plate extends elongatedly along the first direction when viewed from the bottom part of the case, and
the lead extends elongatedly along the first direction.

2. The power storage device according to claim 1, wherein the gasket further includes a rising part extending from a peripheral edge of the base in a direction away from the power storage element and a fold part extending from an end of the rising part toward an inside of the case, the fold part having an annular shape and covering at least a part of an upper surface of the outer peripheral part of the sealing plate,
an annular groove is formed in an outer circumferential surface of the tubular part of the case,
a region in which the groove is formed protrudes to the inside of the case on an inner circumferential surface of the tubular part,
the sealing member is positioned on the groove, and
the another end of the tubular part is folded toward the inside of the case and contacts an upper surface of the fold part.

3. The power storage device according to claim 1, wherein the deformable part of the sealing plate includes a collector part on which the protrusion is formed and a thin part provided between the outer peripheral part and the collector, the thin part being thinner than the collector part and the outer peripheral part.

4. The power storage device according to claim 1, wherein an inner circumferential surface of the through-hole is inclined such that the through-hole tapers toward the lead.

5. The power storage device according to claim 1, wherein the base has a vent hole therein, the vent hole being configured to transmit the internal pressure of the case to the sealing plate through the vent hole.

6. The power storage device according to claim 1, wherein the lead includes a strip part connected to the protrusion of the sealing plate,
the strip part is connected to the protrusion at a welded part, and
the welded part has a longitudinal direction along the first direction when viewed from the bottom part of the case.

7. The power storage device according to claim 1, wherein the lead includes a strip part connected to the protrusion of the sealing plate, and
an end of the strip part in a direction in which the strip part extends crosses the first direction when viewed from the bottom part of the case.

8. The power storage device according to claim 1, wherein at least one rib is provided on a surface of the base directed to the lead.

9. The power storage device according to claim 8, wherein the at least one rib comprises two ribs arranged such that the through-hole is provided between the two ribs, and
the lead includes a strip part disposed between the two ribs and connected to the protrusion of the sealing plate.

10. The power storage device according to claim 9, wherein
the lead includes a wide part connected to the strip part and having a width larger than a width the strip part, and
the width of the wide part is larger than a distance between the two ribs.

11. The power storage device according to claim 9, wherein
the lead includes two wide parts connected to both ends of the strip part, respectively, the two wide parts having widths larger than a width of the strip part,
the widths of the two wide parts are larger than a distance between the two ribs, and
the lead is disposed such that at least a part of the two ribs is provided between the two wide parts.

12. A power storage device comprising:
a case including a tubular part having a cylindrical shape, a bottom part closing one end of the tubular part, and an opening provided at another end of the tubular part;
a power storage element disposed in the case, the power storage element including a pair of electrodes;
a lead connected to one electrode of the pair of electrodes; and a sealing member sealing the opening of the case, wherein:

the sealing member includes a gasket having an insulating property and a sealing plate having conductivity, the gasket including a base having a disk shape, the sealing plate includes a displaceable part and an outer peripheral part provided around the displaceable part, the displaceable part including a protrusion protruding toward the power storage element, the base is disposed between the sealing plate and the power storage element, the base has a through-hole formed therein, the protrusion of the sealing plate is inserted in the through-hole, the protrusion of the sealing plate is connected to the lead, the protrusion is configured to be displaced in a direction away from the lead in accordance with an increase of an internal pressure of the case so as to be disconnected from the lead, the gasket further includes a rising part extending from a peripheral edge of the base in a direction away from the power storage element and a fold part extending from an end of the rising part toward an inside of the case, the fold part having an annular shape and covering at least a part of an upper surface of the outer peripheral part of the sealing plate, the fold part is in direct contact with the at least part of the upper surface of the outer peripheral part of the sealing plate, the displaceable part includes a first surface facing the power storage element and a second surface opposite to the first surface, the second surface is exposed to an outside of the sealing member, and an inner circumferential surface of the through-hole is inclined such that the through-hole tapers toward the lead.

13. The power storage device according to claim 12, wherein:

an annular groove is formed in an outer circumferential surface of the tubular part of the case, a region in which the groove is formed protrudes to the inside of the case on an inner circumferential surface of the tubular part, the sealing member is positioned on the groove, and the another end of the tubular part is folded toward the inside of the case and contacts an upper surface of the fold part.

14. The power storage device according to claim 12, wherein the deformable part of the sealing plate includes a collector part on which the protrusion is formed and a thin part provided between the outer peripheral part and the collector, the thin part being thinner than the collector part and the outer peripheral part.

15. The power storage device according to claim 12, wherein the base has a vent hole therein, the vent hole being configured to transmit the internal pressure of the case to the sealing plate through the vent hole.

16. The power storage device according to claim 12, wherein at least one rib is provided on a surface of the base directed to the lead.

17. A power storage device comprising:

a case including a tubular part having a cylindrical shape, a bottom part closing one end of the tubular part, and an opening provided at another end of the tubular part;

a power storage element disposed in the case, the power storage element including a pair of electrodes;

a lead connected to one electrode of the pair of electrodes; and a sealing member sealing the opening of the case, wherein the sealing member includes a gasket having an insulating property and a sealing plate having conductivity, the gasket including a base having a disk shape, the sealing plate includes a displaceable part and an outer peripheral part provided around the displaceable part, the displaceable part including a protrusion protruding toward the power storage element, the base is disposed between the sealing plate and the power storage element, the base has a through-hole formed therein, the protrusion of the sealing plate is inserted in the through-hole, the protrusion of the sealing plate is connected to the lead, and the protrusion is configured to be displaced in a direction away from the lead in accordance with an increase of an internal pressure of the case so as to be disconnected from the lead, the gasket further includes a rising part extending from a peripheral edge of the base in a direction away from the power storage element and a fold part extending from an end of the rising part toward an inside of the case, the fold part having an annular shape and covering at least a part of an upper surface of the outer peripheral part of the sealing plate, the fold part is in direct contact with the at least part of the upper surface of the outer peripheral part of the sealing plate, the displaceable part includes a first surface facing the power storage element and a second surface opposite to the first surface, the second surface is exposed to an outside of the sealing member, and the base has a vent hole therein, the vent hole being configured to transmit the internal pressure of the case to the sealing plate through the vent hole.

18. A power storage device comprising:

a case including a tubular part having a cylindrical shape, a bottom part closing one end of the tubular part, and an opening provided at another end of the tubular part;

a power storage element disposed in the case, the power storage element including a pair of electrodes;

a lead connected to one electrode of the pair of electrodes; and a sealing member sealing the opening of the case, wherein the sealing member includes a gasket having an insulating property and a sealing plate having conductivity, the gasket including a base having a disk shape, the sealing plate includes a displaceable part and an outer peripheral part provided around the displaceable part, the displaceable part including a protrusion protruding toward the power storage element, the base is disposed between the sealing plate and the power storage element, the base has a through-hole formed therein, the protrusion of the sealing plate is inserted in the through-hole, the protrusion of the sealing plate is connected to the lead, and the protrusion is configured to be displaced in a direction away from the lead in accordance with an increase of an internal pressure of the case so as to be disconnected from the lead, the gasket further includes a rising part extending from a peripheral edge of the base in a direction away from the power storage element and a fold part extending from an end of the rising part toward an inside of the case, the fold part having an annular shape and covering at least a part of an upper surface of the outer peripheral part of the sealing plate, the fold part is in direct contact with the at least part of the upper surface of the outer peripheral part of the sealing plate, the displaceable part includes a first surface facing the power storage element and a second surface opposite to the first surface, the second surface is exposed to an outside of the sealing member, and at least one rib is provided on a surface of the base directed to the lead.

19. The power storage device according to claim 18, wherein:

the at least one rib comprises two ribs arranged such that the through-hole is provided between the two ribs, and the lead includes a strip part disposed between the two ribs and connected to the protrusion of the sealing plate.

20. The power storage device according to claim 19, wherein:

the lead includes a wide part connected to the strip part and having a width larger than a width the strip part, and the width of the wide part is larger than a distance between the two ribs.

21. The power storage device according to claim 19, wherein:

the lead includes two wide parts connected to both ends of the strip part, respectively, the two wide parts having widths larger than a width of the strip part, the widths of the two wide parts are larger than a distance between the two ribs, and the lead is disposed such that at least a part of the two ribs is provided between the two wide parts.

\* \* \* \* \*